US012783377B2

(12) United States Patent
Bonaccorsi, Sr. et al.

(10) Patent No.: US 12,783,377 B2
(45) Date of Patent: Nov. 3, 2026

(54) HOLISTIC HEALTH CHECK FOR SERVICE RESILIENCY

(71) Applicant: FMR LLC, Boston, MA (US)

(72) Inventors: David P. Bonaccorsi, Sr., Coventry, RI (US); Manoj Kumar Rai, Uttar Pradesh (IN); David Brett, Warwick, RI (US); Shikhar Trivedi, Uttar Pradesh (IN); Naveen Mony, Apex, NC (US)

(73) Assignee: FMR LLC, Boston, MA (US)

( * ) Notice: Subject to any disclaimer, the term of this patent is extended or adjusted under 35 U.S.C. 154(b) by 64 days.

(21) Appl. No.: 18/615,953

(22) Filed: Mar. 25, 2024

(65) Prior Publication Data

US 2025/0298713 A1 Sep. 25, 2025

(51) Int. Cl.
*G06F 11/30* (2006.01)
*G06F 11/07* (2006.01)

(52) U.S. Cl.
CPC ...... *G06F 11/3055* (2013.01); *G06F 11/0793* (2013.01); *G06F 11/3006* (2013.01)

(58) Field of Classification Search
CPC ............. G06F 11/3055; G06F 11/3006; G06F 11/0793
USPC .................................................... 714/15, 47.2
See application file for complete search history.

(56) References Cited

U.S. PATENT DOCUMENTS

2020/0034193 A1* 1/2020 Jayaram ................ G06F 3/0644
2020/0241754 A1* 7/2020 Bett ........................ G06F 3/067
2020/0394062 A1* 12/2020 Thomas .................. G06F 9/455
2022/0114004 A1* 4/2022 Hsu ......................... G06F 9/547
2022/0276929 A1* 9/2022 Prashant ............. G06F 11/1662
2024/0126582 A1* 4/2024 Jigalur ................ G06F 9/45558

* cited by examiner

*Primary Examiner* — Chae M Ko
(74) *Attorney, Agent, or Firm* — Cesari and McKenna, LLP

(57) ABSTRACT

A computerized method is provided for holistic evaluation of a containerized microservice's health. Methods can include passively monitoring and recording interactions with the resources the microservice depends on to assess the health of those resources and comparing to selected thresholds to determine potential recovery actions.

20 Claims, 6 Drawing Sheets

HOLISTIC HEALTH CHECK FOR SERVICE RESILIENCY

TECHNICAL FIELD

This application relates generally to systems, methods and apparatuses, including computer program products, for providing holistic health checks for service resiliency.

BACKGROUND

Cloud computing and virtualization can allow for efficient, on-demand use of system resources as well as provide resiliency as multiple instances of an application can be organized and run simultaneously or in a backup switch manner upon detection of failures. Containerization and Application Programming Interfaces (APIs) are important tools in cloud computing allowing communication across disparate programs and resources and system or application-level virtualization. Understanding the health of the APIs is important in identifying errors and maintaining resiliency. Instances of APIs running in the cloud generally need to assess resiliency at runtime and publish their state of health. In containerized systems, this information is typically used by the container orchestration system, such as Kubernetes, to manage the lifecycle of a particular containerized instance of the API.

Container orchestration systems such as Kubernetes offer liveness and readiness probes to control the health of an application running inside a pod of a container orchestration system. Liveness probes indicate if a container application is responsive or may require a restart while readiness probes determine if the live container application is ready to receive traffic. Such probes, along with other current health checks, rely on active polling and must balance a desire for resiliency with a desire not to weigh down system resources with active polling. Additionally, current health checks do not always identify or predict system failures, especially in applications relying on numerous disparate databases and other programs and resources.

SUMMARY

Systems and methods described herein support passive, holistic health assessment of a containerized application and the resources it interacts with including machine-to-machine models of signaling in order to initiate an automated action to take place within the container orchestration system.

Using systems and method of the invention, an API instance can assess the health of all the resources it interacts with and report its health “holistically” based on the state of those resources. Resources such as backend service endpoints, critical databases and JVM metrics (e.g., CPU Utilization and memory/heap utilization) can be monitored and, based on their state, the API can in turn publish its health back to the container orchestration system. Systems and methods of the invention allow an API developer to define a set of resources and to set acceptable error thresholds that are returned from the resources. Based on these configured thresholds the API can return its holistic health so the orchestration system can take appropriate actions to manage the environment based on how it is configured. The developer can further define what those appropriate actions are in response to various error thresholds.

Developers creating and running containerized applications that are often mission critical need a consistent library and the capability to assess the health of a running pod instance that is executing the API or service. For example, a common configuration may be APIs rendered as micro services running in a container and orchestrated by the container orchestration system (i.e., Kubernetes). The micro service executing in the cloud should assess its general health with the least amount of polling of resources and then respond to probes in the container orchestration system to indicate whether it is healthy or not. In certain embodiments, the present systems and methods provide a mechanism for the micro services to assess the holistic health of their various resources based on the last N negative responses in a given interval. Whether or not a preset threshold of negative responses is reached or not reached can indicate that the Pod should be recycled, which can occur automatically. By evaluating not just the health of the containerized microservice but independently monitoring the resources on which the microservice depends, all while minimizing the use of active polling and therefore the burden on the system, systems and methods of the invention improve the function of the containerized microservice and, therefore, the computer itself.

In various embodiments, systems and methods of the invention allow a developer to configure a set of resources required for given containerized application and to set acceptable error thresholds for one or more of those resources individually or holistically. A holistic algorithm can be used to evaluate the resource thresholds for error responses that are returned from the resources. Based on these configured thresholds, the API can return its holistic health so that the container orchestration system can take appropriate actions to manage the OS environment based on the configuration set by the developer. The developer can also, based on the thresholds, establish passive and/or active actions to restore health. Passive actions can include, for example, creating logs or notifying administrators while active actions can include automatically implementing system changes such as restarting the application or driving a failover switch.

Aspects of the invention can include a computerized method for monitoring resource health in a containerized application. Methods may include providing a containerized microservice in communication with a plurality of resources and operable to perform a function dependent on the plurality of resources; receiving, by the containerized microservice, status information from the plurality of resources; comparing, by the containerized microservice, the status information from the plurality of resources to a predefined threshold to determine holistic health of the containerized application; and taking a predefined recovery action where the status information exceeds the predefined threshold.

In certain embodiments, the predefined recovery action may be selected from the group consisting of a passive recovery action and an active recovery action. The passive recovery action can include writing a log record of the status information to a central log aggregation in a cloud monitoring program. The active recovery action may comprise driving a failover region switch.

In some embodiments, the predefined threshold can include a plurality of levels corresponding to a plurality of passive and active recovery actions based on the level. The holistic health of the containerized application can comprise both readiness and liveness of the microservice. Methods can include reporting the holistic health of the containerized application to a container orchestration system. In various embodiments, the container orchestration system can be Kubernetes-based.

In certain embodiments, methods may include reporting the readiness health of the containerized application as ready or not ready in response to a readiness probe from the container orchestration system and reporting the liveness health of the containerized application as pod saturated or pod non saturated in response to a liveness probe from the container orchestration system. The status information can comprise HTTP 200 and HTTP non-200 error codes. Methods can further comprise identifying each of the plurality of resources and defining a threshold for each of the plurality of resources.

The plurality of resources can include two or more selected from the group consisting of: a backend service endpoint, a critical database, an event, JVM resources, and HTTP/REST-based child services. In some embodiments, the containerized microservice may receive status information in a passive manner in that the service does not actively poll the downstream resources but instead only records status information reported in the course of normal operations.

In certain aspects systems for monitoring resource health in a containerized application are described. Systems can include a plurality of resources and a containerized microservice in communication with and operable to perform a function dependent on the plurality of resources. The containerized microservice can be operable to receive status information from the plurality of resources; compare the status information from the plurality of resources to a predefined threshold to determine holistic health of the containerized application; and execute a predefined recovery action when the status information exceeds the predefined threshold. In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
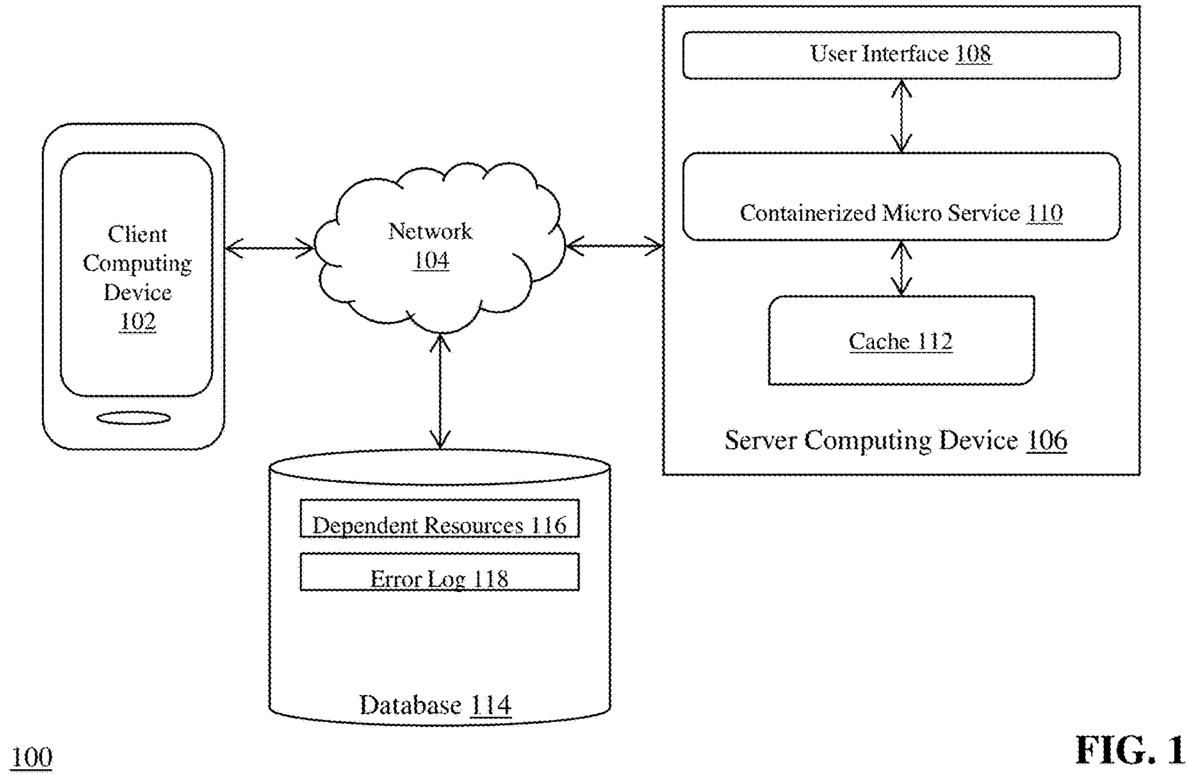
FIG. 1 is a block diagram of a system for monitoring resource health in a containerized application.

FIG. 1 is a block diagram of a system 100 for monitoring resource health in a containerized application. The system 100 includes a client computing device 102, a communications network 104, a server computing device 106 that includes a user interface module 108, containerized microservice 110 (in a POD run by a container orchestration platform such as Kubernetes, not shown) and a data cache 112 as well as a database 114 that includes various dependent resources that the containerized micro service might rely on 116 and an error log that the system may write to as described below 118.

The client computing device 102 connects to one or more communications networks (e.g., network 104) in order to communicate with the server computing device 106 to as a consumer or user of the containerized micro service. Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used to provide input to and receive output from the server computing device 106. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions associated with the containerized microservice. Generally, a browser application comprises software executing on a processor of the client computing device 102 that enables the client computing device to communicate via HTTP or HTTPS with remote servers addressable with URLs (e.g., server computing device 106) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform the intended functions of the containerized microservice(s) 110. The server computing device 106 includes a user interface module 108, one or more containerized micro services 110, and a data cache for the containerized microservice 112 that execute on the processor of the server computing device 106. In some embodiments, the modules 108, 110, and 112 are specialized sets of computer software instructions programmed onto one or more dedicated processors in the server computing device 106 and can include specifically designated memory locations and/or registers for executing the specialized computer software instructions.

Although the computing elements 108, 110, and 112 are shown in FIG. 1 as executing within the same server computing device 106, in some embodiments the functionality of the computing modules 108, 110, and 112 can be distributed among a plurality of server computing devices as can be appreciated as a feature of containerized software. As shown in FIG. 1, the server computing device 106 enables the computing elements 108, 110, and 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing elements 108, 110, and 112 is described in detail throughout this specification.

The database 114 is a computing device (or in some embodiments, a set of computing devices) coupled to the server computing device 106 (in some embodiments, via communications network 104) and is configured to receive, generate, and store specific segments of data relating to the processes of the containerized microservice 110. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below.

An administrator or programmer can input or change the error thresholds and/or responses for any containerized microservice with the holistic health monitoring feature using the user interface 108.

Figure 2:
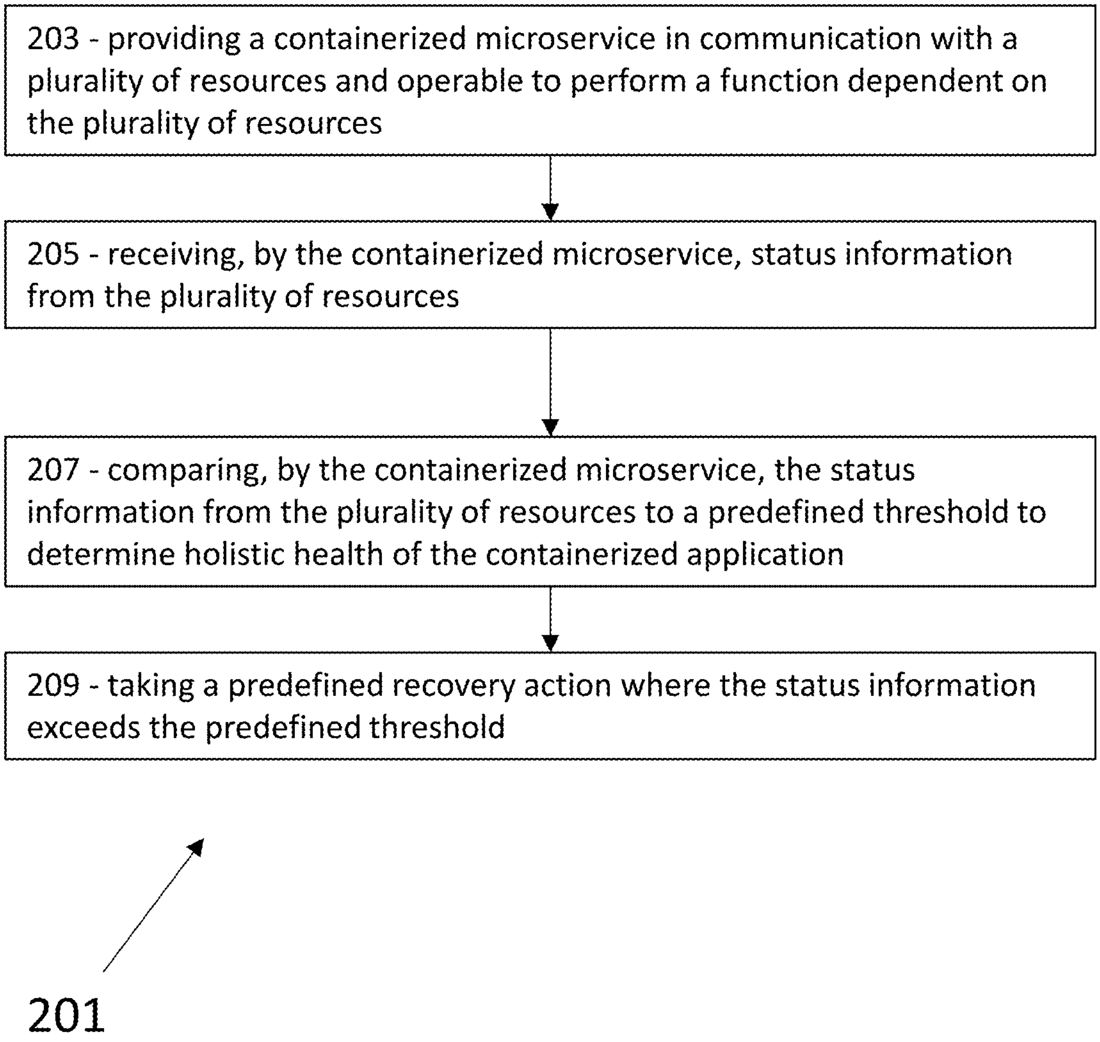
FIG. 2 shows an exemplary computerized method for monitoring resource health in a containerized application.

FIG. 2 shows an exemplary method 201 for monitoring resource health in a containerized application. A containerized microservice is provided 203 that relies on multiple resources to operate and performs a function dependent on those resources. For example, a first microservice may be dependent upon HTTP connections to a second and/or third microservice as well as Java database connectivity (JDBC) connections to databases that the first microservice maintains. Additionally, CPU, Memory and Connection Pool resources thresholds that Microservice A consumes throughout its lifecycle. A plurality of microservice containers, each associated with a different application, service, or other functionality can be implanted on a server computing device or across a series of real or virtual computing devices. The use of microservice containers allows the use of shared resources (e.g., namespaces, filesystem volumes, network resources, storage, etc.) for multiple independent software images and related dependencies, for a plurality of individual users. An example microservice architecture that can be used by the systems and methods described herein is the Kubernetes™ platform (available from kubernetes.io), in which pods are deployed to host one or more application containers that work together to provide a unit of service (such as access to and functionality from a service endpoint) to a remote computing device. Exemplary computing devices are described below but include any physical or virtual device or group of networked devices comprising memory for storing instructions and a processor for executing those instructions.

The containerized microservice receives 205 status information from the various resources. That status information can include, for example, HTTP codes such as 200 (successful responses) error codes or non-200 error codes (e.g., 400 or 500 error codes). Of particular note are the successful, e.g., 2xx, status codes that may not cause an immediate failure or trigger a response using traditional monitoring methods but, taken in aggregate may negatively affect microservice performance or serve as an early warning of upcoming issues.

The containerized microservice can then compare 207 the status information from the plurality of resources to a predefined threshold to determine holistic health of the containerized application. For example, a developer, working on the microservice, can identify the resources on which it depends, and set one or more thresholds indicative of holistic health. In various embodiments, those thresholds can include a total number of errors across all dependent resources, a threshold number of errors for each particular resource (including a different threshold for each resource), a threshold number of errors of a particular type, or any combination thereof. In certain embodiments, errors of certain types or from certain resources may be weighted more than others when aggregating for comparison to a threshold.

If the errors or other status information exceeds one or more predefined thresholds, the containerized microservice can take a predefined action 209. In certain embodiments, multiple thresholds may exist each dictating a different responsive action when passed. For example, an initial threshold may be set with lower error tolerance for which the predefined action is a passive recovery action such as writing a log record of the error(s) or other status information to a central log aggregation in a cloud monitoring program. A secondary threshold may be instituted having a higher error tolerance but demanding a more intrusive, active recovery action such as driving a failover region switch when passed.

Kubernetes Cloud Container Orchestration Cluster supports readiness and liveness probes to signal the state of an application PODs health. Services using Kubernetes orchestration such as Amazon's Elastic Kubernetes Service (EKS) are expected to use these probes to indicate health of the POD or Application throughout the processing lifecycle. Services can be deployed into a Kubernetes Cluster or Namespaces across various Availability Zones (AZ) thereby providing resilience with Kubernetes managing PODS/Nodes across the 3 AZ's.

Spring Boot, a popular open-source Java framework for creating microservices and web applications, also provides support for signaling Readiness and Liveness using actuator features and health groups. However, none of these probes or health assessments take a holistic view of the resources associated with POD health. Systems and methods of the invention can use system and application level "golden signals" to assess the health of resources supporting the service.

The various signals from dependent resources observed using systems and methods of the invention can provide a "passive way" to inspect and detect availability of those dependent resources. This is a system and network friendly approach as it avoids active polling. A holistic health check algorithm, as described, can then be used to assess the overall health of the service or POD and then signal the healthy or unhealthy response to the respective probe responses, thereby providing a more comprehensive and accurate picture of overall service health with less system resources. Additional metrics that may be considered in assessing service and resource health can include Java Virtual Machine (JVM) Health, classic golden signals, CPU, thread pool, memory, and connection pool.

Figure 3:
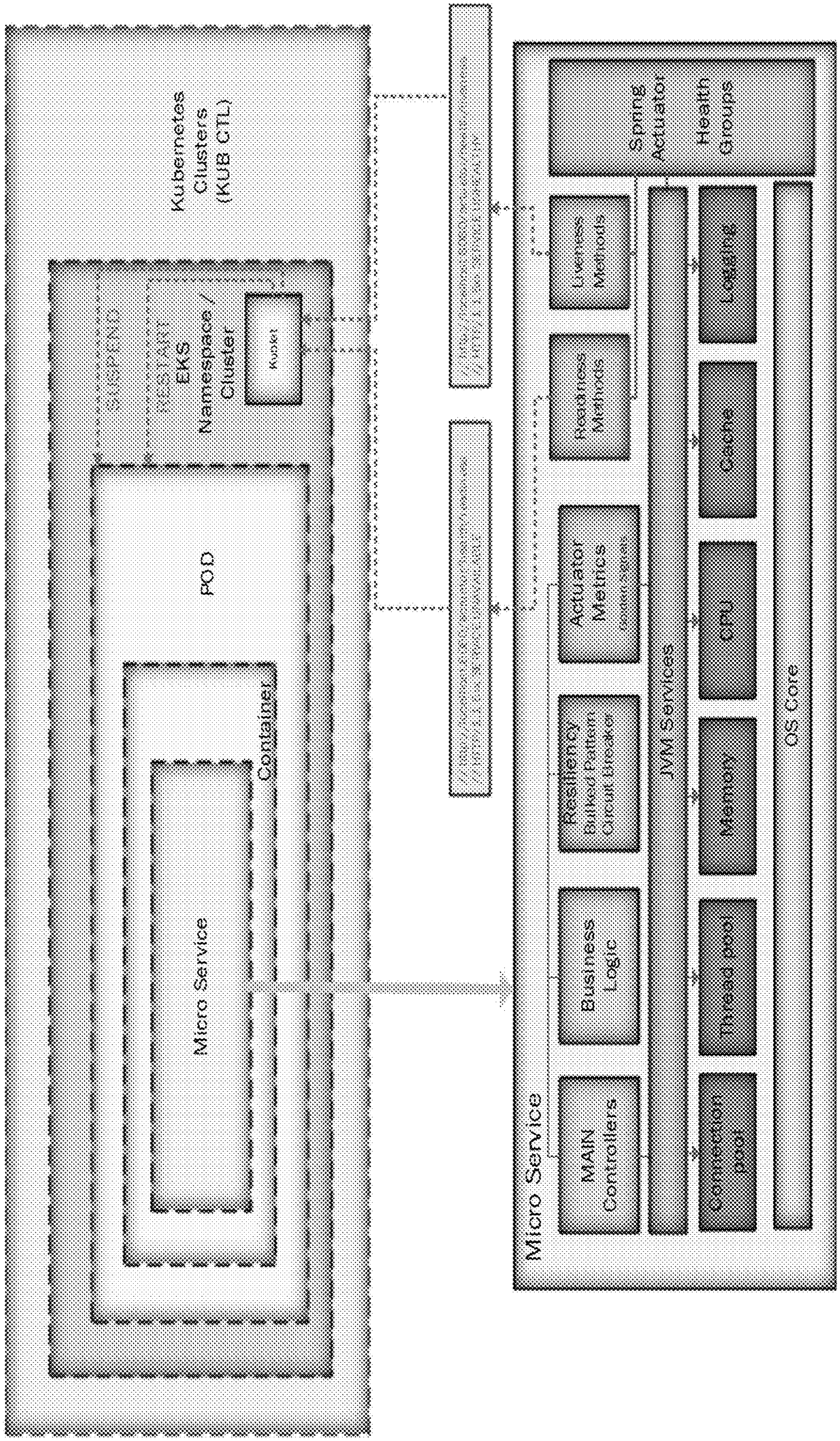
FIG. 3 shows an exemplary container architecture with holistic health checking according to certain embodiments.

FIG. 3 shows an exemplary container architecture with holistic health checking according to certain embodiments. A microservice is being run in a container within a Kubernetes POD as understood in the art. The health check is monitoring JVM health status through JVM services and the microservice can return the holistic health as determined using the methods described herein to a kubelet in response to readiness or liveness probes. A kubelet is the primary "node agent" that runs on each node. It can register the node with the apiserver and takes a set of PodSpecs that are provided through various mechanisms and ensures that the containers described in those PodSpecs are running and healthy. The kubelet, in response to the determined holistic health, can take actions such as suspending or restarting the POD.

Figure 4:
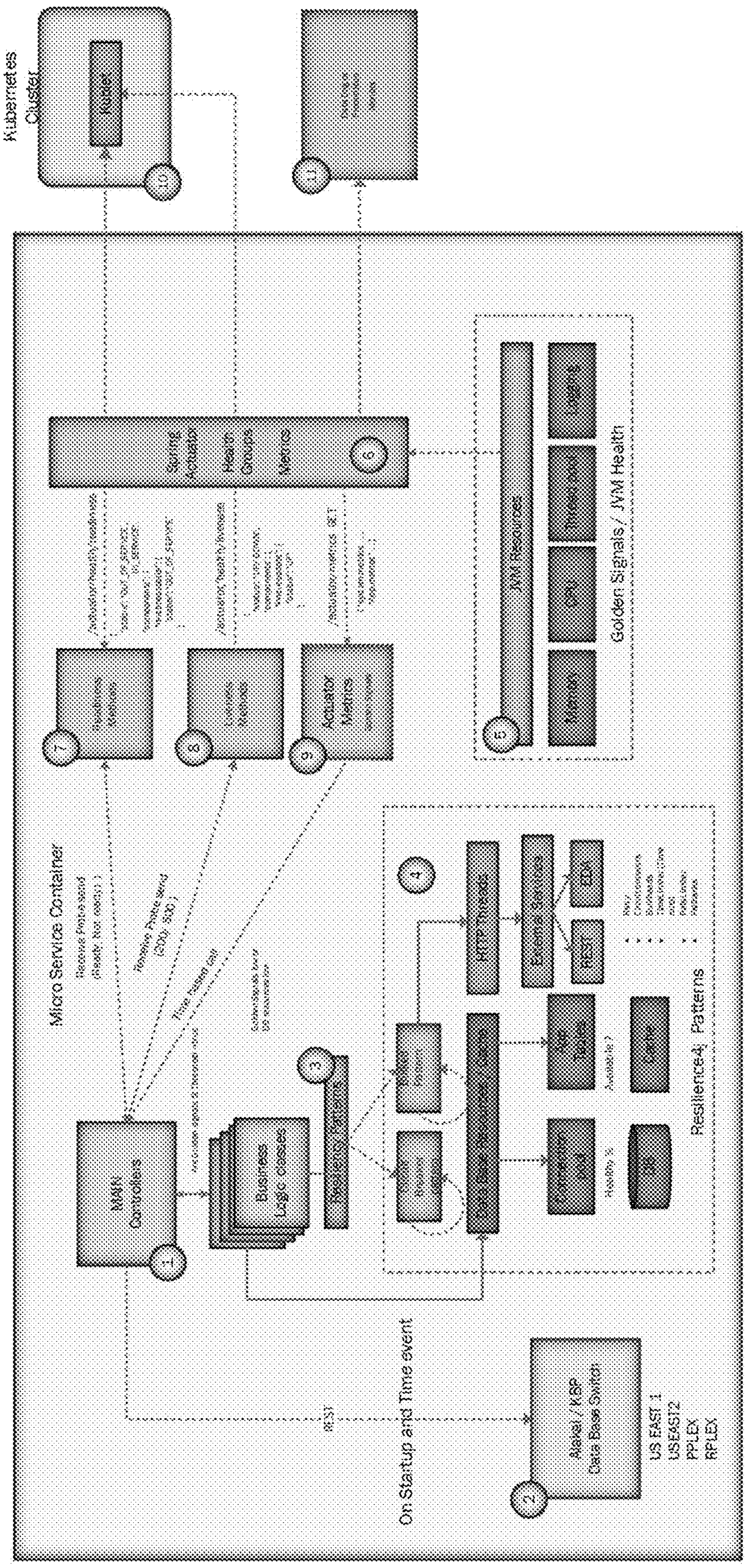
FIG. 4 shows system context for an exemplary method for monitoring resource health in a containerized application according to certain embodiments.

FIG. 4 shows system context for an exemplary method for monitoring resource health in a containerized application according to certain embodiments. A microservice container is depicted communicating with a kubelet in a Kubernetes cluster. The microservice container assesses database resources and external services including connection pools, databases, app tables, and caches as well as golden signals and JVM resource health. The main controllers respond to readiness probes with ready or not ready and to liveness probes with codes such as 200 (success status response codes) or 500 (server error response codes) HTTP response status codes. Holistic health is aggregated and compared to a threshold (e.g., a number and/or severity of errors) above which a preselected recovery action may be taken including passive actions such as creating a log of the holistic health report.

Figure 5:
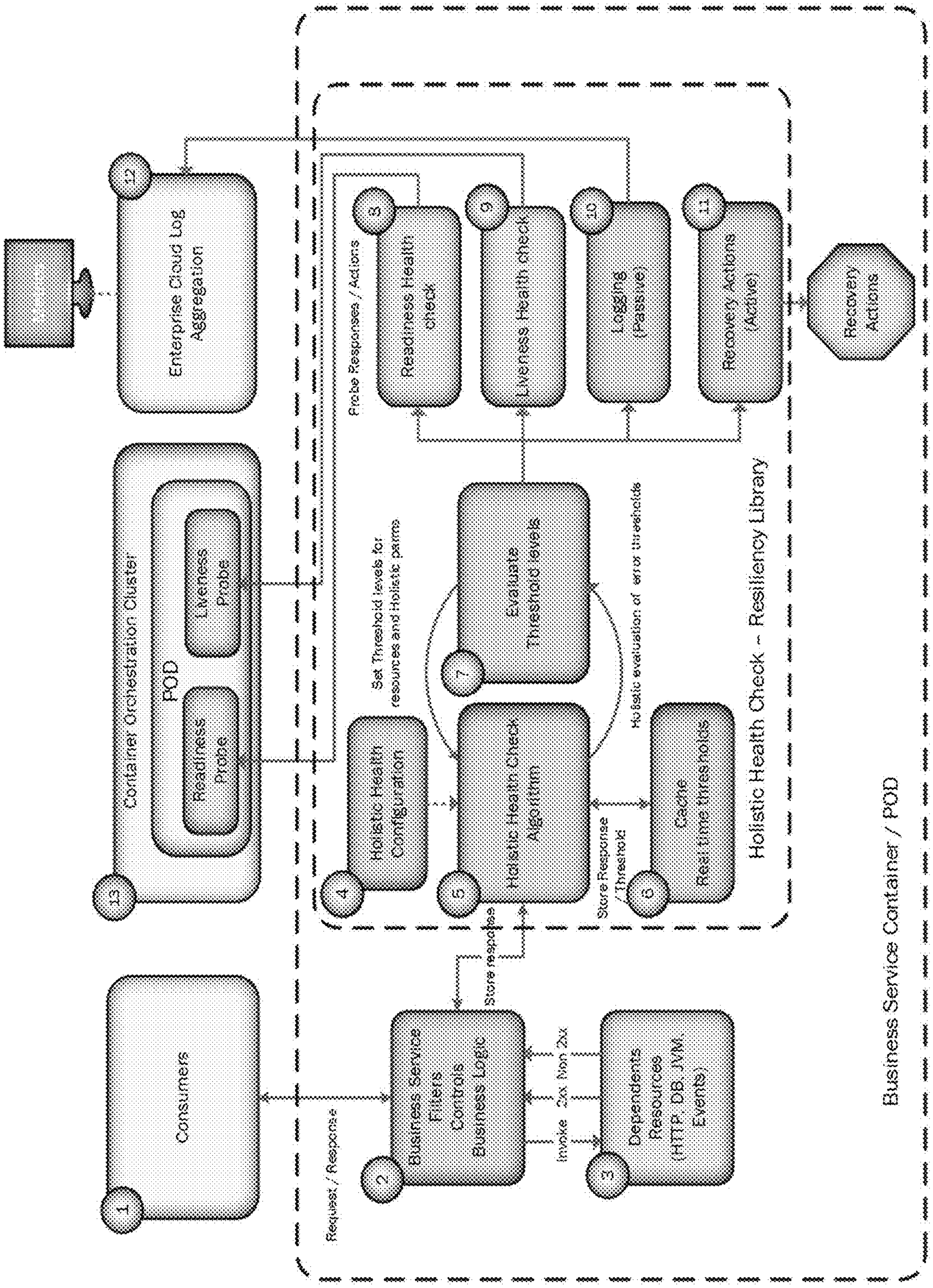
FIG. 5 shows an exemplary flow chart for a method for monitoring resource health in a containerized application according to certain embodiments.

FIG. 5 shows an exemplary flow chart for a method for monitoring resource health in a containerized application according to certain embodiments. Depicted is a business service container or POD. Consumers interact with the business service via requests and responses. The business service interacts with its resources while performing its intended functions (e.g., HTTP resources, databases, JVM resources, and events) and records instances of response status codes (including 200 and non 200 codes). The holistic health check algorithm will have been configured by an administrator with identified resources, holistic health thresholds, and associated responses or recovery actions. The holistic health check algorithm receives the status codes from the business service's resources to cache real time thresholds and holistically evaluate the received and stored status codes against the threshold levels. Based on this determined holistic health and the preset thresholds, the business service container or POD can respond to readiness or liveness probes from the container orchestration cluster (e.g., Kubernetes cluster), take a passive recovery action such as logging the health status in, for example, a cloud log aggregation, or take active recover action such as restarting the business service or driving a failover switch.

In an exemplary method, a consumer sends request to business service. The business service receives response and executes business logic and access to dependent resources. The dependent resources respond with 200 and non 200 error codes that are evaluated against the threshold. The holistic health check provides configuration options to set resources, thresholds on resources, and holistic behavior options. Filtered resource responses are stored in memory in a cache and evaluated in real time against service defined thresholds. The holistic health check algorithm evaluates error behavior against defined thresholds for each resource (and/or all resources in aggregate) in real time and, if a threshold is reached, acts on "passive" and/or "active" predefined recovery actions. Readiness health is flowed to an orchestration readiness probe based on POD "Ready", Not Ready evaluation by the holistic health check algorithm. Liveness health is flowed to an orchestration liveness probe based on Pod Saturated, not Saturated resource evaluation in the holistic health algorithm which can result in POD recycle.

Passive actions can include writing log records to central log aggregation in Cloud monitoring. Active actions can include reporting to administrators and/or enacting recovery actions. An Enterprise Cloud log aggregation facility may be provided to log the results of holistic health check evaluation actions. The Cloud Orchestration System executing the POD can provide health check probes for evaluating POD health responses.

Figure 6:
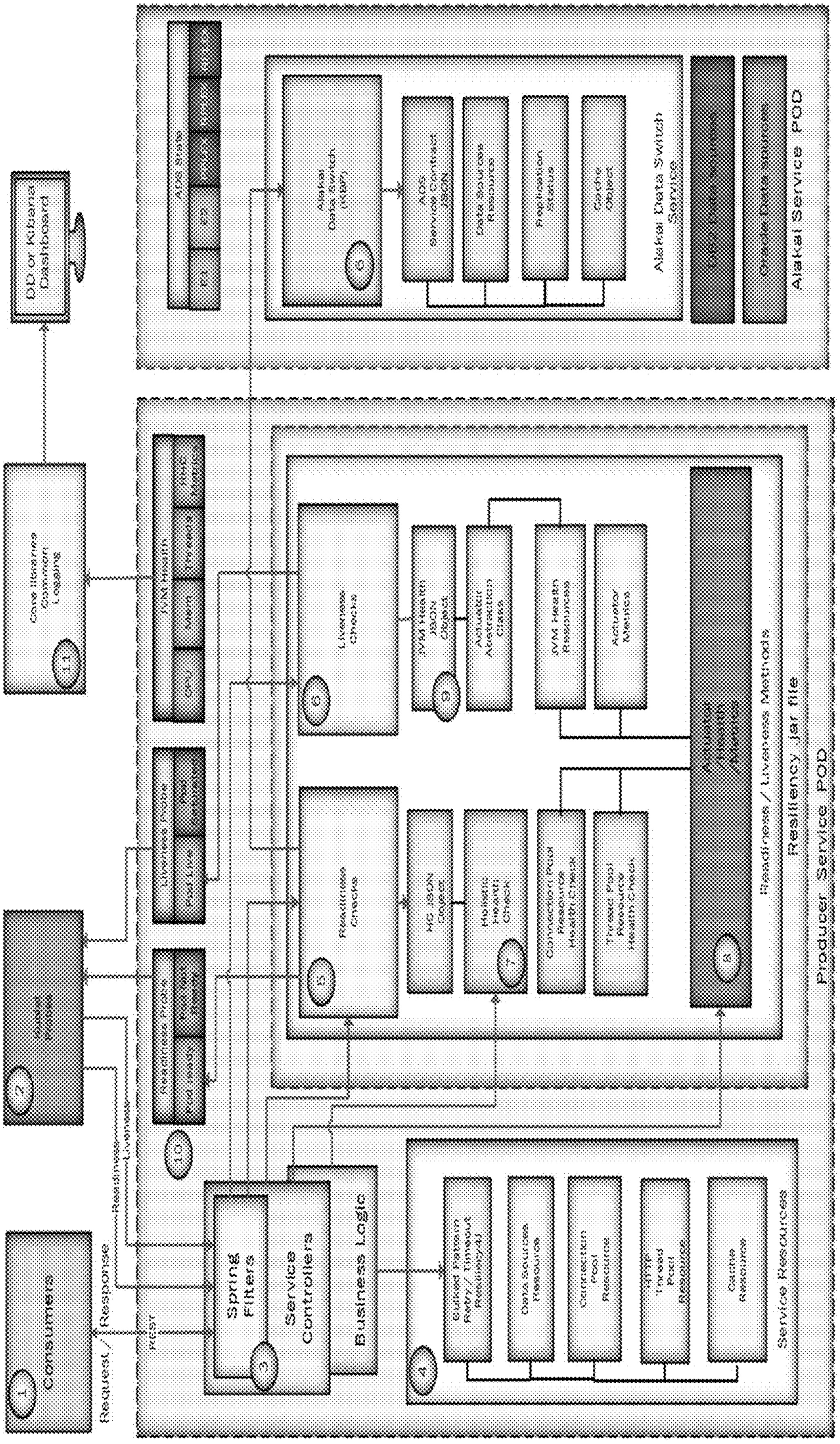
FIG. 6 shows an exemplary resiliency framework and class flow diagram for a method for monitoring resource health in a containerized application according to certain embodiments.

FIG. 6 shows an exemplary resiliency framework and class flow diagram for a method for monitoring resource health in a containerized application according to certain embodiments.

The Producer Service POD receives normal REST Requests from a Consumer that will be evaluated by the resiliency framework (Holistic Health Check HHC). Kubernetes can send periodic probes for Readiness and Liveness to the Producer Service POD, as configured in the Producer Helm Script (YAML), which will be handled in the Resiliency Health check framework. The Producer can implement Spring Filter methods to intercept the incoming requests and responses to save in the HHC cache for evaluation (Last "n" transactions).

The Producer Service should also implement resilience4j, Circuit Breaker and Bulked patterns, to protect critical resources (connection pools, thread pools) from one consumer/target saturating the resources as well as proper timeout, retry, and fallback patterns.

The Readiness Probe from Kubernetes can be implemented and extended in the reference implementation of the readiness classes. The Readiness check can evaluate the Holistic Health Check classes that then evaluate the last "n" requests based on configurable thresholds for POD readiness and the general JVM health as to service saturation. The POD can then signal ready (200)/not ready (non 200) to the kubelet in response to the probes. The Holistic Heath Check can be implemented as part of the Readiness check to work "passively" to evaluate responses to dependent downstream resources. An acceptable response evaluation range can be configured by the administrator.

The Liveness Probes from Kubernetes can be implemented in the resiliency framework and can assess the JVM Health based on real time metrics from Spring Actuator. The framework can provide an extensible abstraction class (key metrics JVM metrics)/status object for consistent evaluation. A Resiliency Framework can be implemented as an extensible.jar file.

A data switch service can be called from the Readiness check (on Startup) and on selected intervals to check the Region availability of the DB location. The DB location can change due to site issues and/or periodic maintenance. The data switch may be enhanced to reflect cross-site replication timings and also return the state of other key DB resources. Common status objects can be used by the resilience framework for consistent evaluation and reporting.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implements one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for monitoring resource health in a containerized application, the method comprising:
- providing a containerized microservice in communication with a plurality of resources and operable to perform a function dependent on the plurality of resources;
- receiving, by the containerized microservice, status information from the plurality of resources;
- comparing, by the containerized microservice, the status information from the plurality of resources to a predefined threshold to determine holistic health of the containerized application; and
- taking a predefined recovery action where the status information exceeds the predefined threshold.

2. The computerized method of claim 1, wherein the predefined recovery action is selected from a passive recovery action or an active recovery action.

3. The computerized method of claim 2, wherein the passive recovery action comprises writing a log record of the status information to a central log aggregation in a cloud monitoring program.

4. The computerized method of claim 2, wherein the active recovery action comprises driving a failover region switch.

5. The computerized method of claim 2, wherein the predefined threshold comprises a plurality of levels corresponding to a plurality of passive and active recovery actions based on the level.

6. The computerized method of claim 1, wherein the holistic health of the containerized application comprises both readiness and liveness of the microservice.

7. The computerized method of claim 6, further comprising reporting the holistic health of the containerized application to a container orchestration system.

8. The computerized method of claim 7, wherein the container orchestration system is Kubernetes-based.

9. The computerized method of claim 8, comprising reporting the readiness health of the containerized application as ready or not ready in response to a readiness probe from the container orchestration system and reporting the liveness health of the containerized application as pod saturated or pod non saturated in response to a liveness probe from the container orchestration system.

10. The computerized method of claim 1, wherein the status information comprises HTTP 200 and HTTP non-200 error codes.

11. The computerized method of claim 1, further comprising identifying each of the plurality of resources and defining a threshold for each of the plurality of resources.

12. The computerized method of claim 1, wherein the plurality of resources comprises two or more selected from a backend service endpoint, a critical database, an event, JVM resources, or HTTP/REST-based child services.

13. The computerized method of claim 1, wherein the containerized microservice avoids polling the downstream resources.

14. A computer system for monitoring resource health in a containerized application, the system comprising:
- a plurality of resources;
- a containerized microservice in communication with and operable to perform a function dependent on the plurality of resources;
- wherein the containerized microservice:
  - receives status information from the plurality of resources;
  - compares the status information from the plurality of resources to a predefined threshold to determine holistic health of the containerized application; and
  - executes a predefined recovery action when the status information exceeds the predefined threshold.

15. The computer system of claim 14, wherein the predefined recovery action is selected from writing a log record of the status information to a central log aggregation in a cloud monitoring program, restarting the containerized microservice, or driving a failover region switch.

16. The computer system of claim 14, wherein the holistic health of the containerized application comprises both readiness and liveness of the microservice.

17. The computer system of claim 16, further comprising reporting the holistic health of the containerized application to a container orchestration system.

18. The computer system of claim 17, comprising reporting the readiness health of the containerized application as ready or not ready in response to a readiness probe from the container orchestration system and reporting the liveness health of the containerized application as pod saturated or pod non saturated in response to a liveness probe from the container orchestration system.

19. The computer system of claim 14, wherein the status information comprises HTTP 200 and HTTP non-200 error codes.

20. The computer system of claim 14, wherein the plurality of resources comprises two or more selected from a backend service endpoint, a critical database, an event, JVM resources, and or HTTP/REST-based child services.

* * * * *